United States Patent [19]
Nath

[11] Patent Number: 5,412,750
[45] Date of Patent: May 2, 1995

[54] LIQUID-CORE LIGHT GUIDE ILLUMINATOR APPARATUS

[76] Inventor: Guenther Nath, Otto Heilmann Strasse 3, 8022 Gruenwald, Germany

[21] Appl. No.: 174,132

[22] Filed: Dec. 28, 1993

[51] Int. Cl.⁶ .......................... G02B 6/20; F21V 7/04
[52] U.S. Cl. ...................... 385/125; 385/133; 385/141; 385/143; 385/901; 362/32
[58] Field of Search ............... 385/14, 15, 31, 38, 385/100, 109, 125, 133, 141, 142, 143, 145, 147, 901; 362/32; 606/1, 2, 14, 15, 16

[56] References Cited

U.S. PATENT DOCUMENTS

| | | | |
|---|---|---|---|
| 3,740,113 | 6/1973 | Cass | 385/125 X |
| 4,009,382 | 2/1977 | Nath | 250/227.11 X |
| 4,045,119 | 8/1977 | Eastgate | 385/125 X |
| 4,194,808 | 3/1980 | Marchic et al. | 385/125 X |
| 4,747,662 | 5/1988 | Fitz | 385/125 X |
| 5,052,778 | 10/1991 | Jamshid | 385/125 |
| 5,165,773 | 11/1992 | Nath | 362/32 |
| 5,267,341 | 11/1993 | Shearin | 385/125 |
| 5,304,171 | 4/1994 | Gregory et al. | 385/125 X |

FOREIGN PATENT DOCUMENTS 4024445  2/1992  Germany ................. 385/125 X

*Primary Examiner*—Brian Healy
*Attorney, Agent, or Firm*—Helfgott & Karas

[57] ABSTRACT

An illuminator apparatus has a light source and a liquid-core light guide comprising a tubular flexible sheath of a fluorocarbon polymer material which is filled with a lightguiding fluid such as glycol, a salt solution containing a chloride, fluoride or phosphate, phenylmethyl silicone oil ($n \approx 1.57$), PCTFE oil, polychlorotrifluoroethylene oil (n=approx. 1.40) or also pure water. The tubular sheath is internally coated with a thin film of Teflon AF ®, the refractive index of which is lower than that of the sheath material.

35 Claims, 1 Drawing Sheet

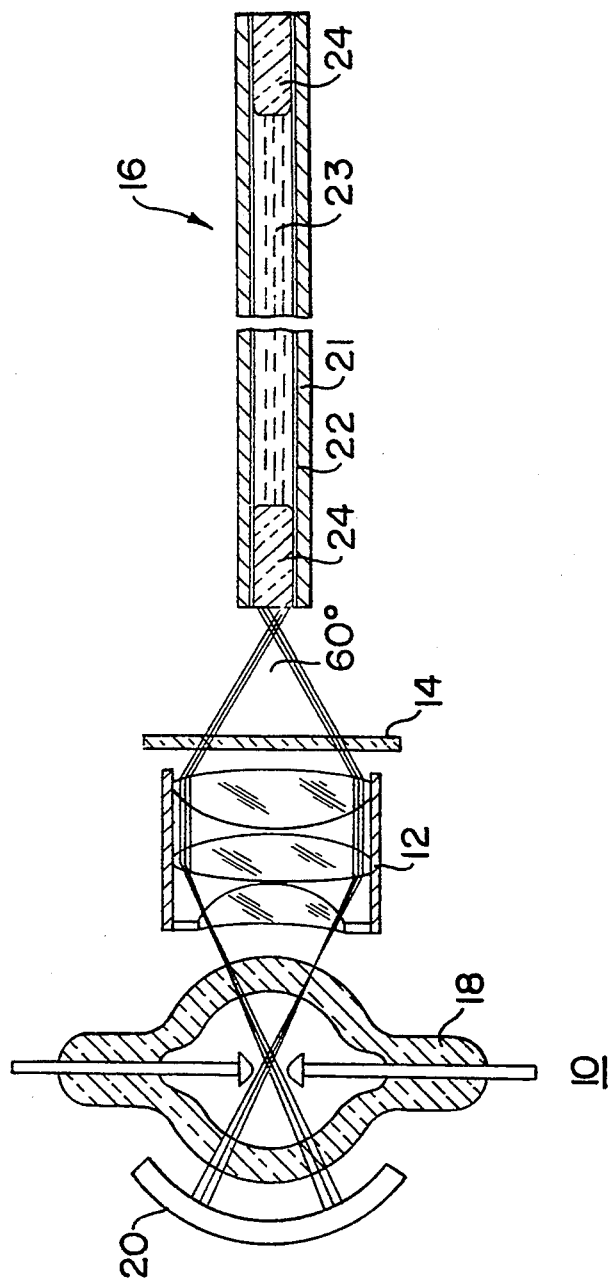

LIQUID-CORE LIGHT GUIDE ILLUMINATOR APPARATUS

FIELD OF THE INVENTION

The invention relates to an illuminator apparatus having a light source and a liquid-core light guide.

DESCRIPTION OF THE RELATED ART

One such illuminator apparatus is known from U.S. Pat. No. 4,009,382. From German Patent 40 24 445 A1 a liquid-core light guide is known, containing a tube of an amorphous fluoropolymer, available under the Trade name TEFLON AF from the Dupont Company and having the formula

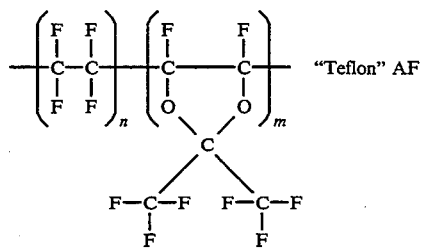 "Teflon" AF based on a combination of tetrafluoroethylene and a fluorated, cyclic ether acting as a spacer to the polymer main chain so that crystallization is obstructed sterically. This amorphous fluoropolymer is as clear as glass and has a low refractive index n (with an increase in glass transition temperature from n=1.315 down to n=1.29). This fluoropolymer is not only relatively rigid, so that light guides produced thereof are difficult to handle even when the tubular sheath is relatively thin-walled, but this material is also difficult to extrude into tubing (modification Teflon AF 2400 being not at all extrudable) and is exceptionally expensive: at this time 1 g granulate costs approx. 10 U.S. $ and thus a batch of 20 kg necessary for extruding has a price of approx. 240,000 U.S. $ resulting in a price of around 100 U.S. $ per meter for an achievable extrusion length of 1,000 to 2,000 m, depending on the wall thickness.

SUMMARY OF THE INVENTION

The invention is based on the object of creating an illuminator apparatus which is of moderate cost and easy to handle and ensures a very good utilization of the radiation emitted by the light source.

It has been found out that a suitable light source in combination with a light guide comprising a flexible liquid-filled tube of a fluorocarbon polymer and having a very thin inside coating or lining of the tubular sheath of the liquid-core light guide of Teflon AF, available in the modifications AF1600 with a refractive index n=1.31, or AF2000 with n=1.30 or AF2400 with n=1.29 from the Dupont Company, in an exceptionally thin film thickness in the region of approx. 3 μm, i.e. in the order of the wavelength of the light to be guided therein, not only results in highly significant savings as regards the production costs, but also surprisingly improves the transmittance of the light guide and thus the optical efficiency of the illuminator apparatus. Particularly in bending of the light guide considerably less transmittance losses are encountered which is of major significance, since a light guide of an illuminator apparatus as used, for instance, as a probe or in dental applications often needs to be strongly curved, whereby of course any reduction in the light output is undesirable.

The coating according to the invention also permits much greater freedom in the selection of the flexible tubing material than in the aforementioned related art since the tubing itself merely needs to serve as a substrate for the Teflon coating. As substrate material for the Teflon AF coating preference is given to fluorocarbons-having a low refractive index (of the order of n=1.35) so that light leakage is minimized in the case of a fault in the coating resulting in direct contact of the lightguiding fluid with the tubing material (i.e. the difference between the refractive indexes n of the lightguiding fluid and of the substrate material of the sheath is made as large as possible). Preferred substrate materials are the terpolymer Hostaflon TFB ® of the Hoechst Company or the Teflons FEP, PTFE, PFA having the following structural formulae or TEFZEL ETFE ® of the Dupont Company or PCTFE (polychlorotrifluoroethylene) or PVDF (3M).

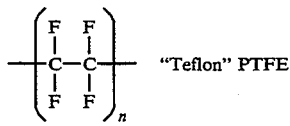 "Teflon" PTFE

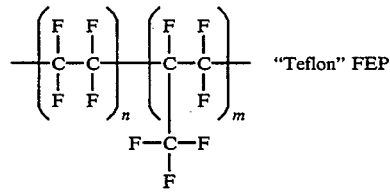 "Teflon" FEP

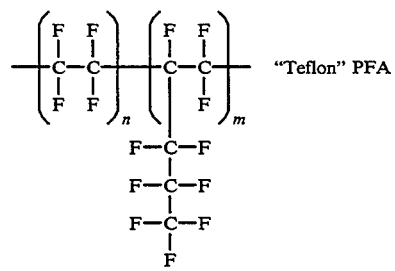 "Teflon" PFA

As lightguiding fluids glycols such as monoethylene, diethylene and tetraethylene triethylene/glycol are preferably suitable, having a high refractive index which is substantially higher than that of the coating material according to the invention.

However since the tubing materials are not totally water vapor tight, it may happen that water vapor in environments of high humidity diffuses through the tubing into the liquid-core in the course of time and cause an undesirable increase in the internal pressure. However, if some water is added to the glycoles right from the start, the difference in the vapor pressure is reduced accordingly so that only a little water vapor diffuses into the tubing and increasing the internal pressure to a lesser degree. This reduces the risk of the quartz or glass plug inserted in the ends of the light guide sheath and serving as a light widow being forced out. However, for the usual tubing materials for the light guide sheath 8% is a limit to the amount of water added, at which the difference between the refractive indexes becomes too small. The coating according to the invention receives however the reserves for this range in difference so that higher additions of water are possible and the undesirable diffusion of water vapor from the environment into the tubing can be even further reduced. In this respect adding water to the amount of at least approx. 6 to 7% up to 10%, 15%, 20% or 30% to triethylene glycol and other glycols has proved to be successful with the resulting reduction in the refractive index being acceptable.

In addition, by employing a mixture of water and glycol antifreeze light guides can be produced which is of major importance for their use in winter outdoors. The higher reserves in the difference of the refractive indexes achieved by the coating according to the invention even permits using purest water as the liquid-core for the light guide effect, particularly when employing Teflon-AF 2400, i.e. the AF material having the highest glass transition temperature and the lowest refractive index of $n=1.29$ which, however, is somewhat more complicated in depositing the coating. A physiological saline solution has also proved to be successful in coating a sheath open at one end, known from the aforementioned German patent 40 24 445.

Reference is also made to aqueous salt solutions such as alkali and alkaline earth halogenides, especially chlorides and fluorides such as $CaCl_2$ solutions having $n \leq 1.45$
$KF$ solutions having $n \leq 1.4$
$CsF$ solutions having $n \leq 1.42$
$NaCl$ solutions having $n \leq 1.40$ as highly suitable lightguiding fluids, whereby the fluoride solutions offer better resistance to shortwave radiation (UVB) than the chloride solutions of which the sodium chloride solution as a physiological saline solution is of importance in medical light guide applications. Also highly suitable are phosphate solutions such as $K_2HPO_4$ solutions having $n \leq 1.42$
$Na_2HPO_4$ solutions having $n \leq 1.42$
$NaH_2PO_4$ solutions having $n \leq 1.42$ which are also more resistant to shortwave radiation (UVB) than chloride solutions. However, chloride solutions are well suited for the transmittance of UVA radiation. Shortwave radiation (UVB) is furnished especially by excimer lasers and H high-pressure lamps, the radiation of which tends to destroy chloride compounds, resulting in deterioration of the transmittance of the light guide. The above-mentioned solutions are usually applied highly concentrated to achieve as high a refractive index as possible for the lightguiding fluid. Further useful lightguiding liquids are PCTFE oils ($n \approx 1.40$) for transmission of near-infrared radiation, e.g. from a tungsten-halogene lamp light source.

The three modifications of the Teflon employed for the coating according to the inventions, namely AF 1600, AF 2000 and AF 2400 have—in accordance with their designations—differing glass transition temperatures of 160° C., 200° C. and 240° C. respectively. Teflon AF 1600 dissolves in liquids comprising fluoridized hydrocarbons up to 6% by weight, Teflon AF 2400 up to only 2% by weight. The three-times higher solubility of the first-mentioned coating material permits a more facilitated application of the coating according to the invention since it is deposited quicker with a higher thickness.

Due to their higher resistance to shortwave radiation (UVB) as compared to chlorides the fluorinated and phospated solutions have a relatively low refraction index and are thus not so suitable with usual tubing materials. Now for the first time these solutions too have become interesting as lightguiding fluids as a result of the coating according to the invention and produce useful transmittances, particularly in the UVA range ($280 \text{ nm} > \lambda > 330 \text{ nm}$).

Producing the coating according to the invention can be achieved by applying a solution of Teflon AF powder, it coming as a complete surprise that a highly stable adhesion of the Teflon AF coating on the inside of the tubing of fluorocarbon polymers can be achieved. This was not at all to be expected, since fluorocarbon polymers are known to have very poor adhesion properties (but very good "slipperiness" by contrast)..This good adhesion also remains when wetted With the cited lightguiding fluids and does not even deteriorate when the light guide is often heavily bent, which is of great importance for a long useful life. The adhesiveness of the coating on the tubing material itself is so good that even when the window plugs are a tight fit in the ends of the tubing, the coating is not damaged., nor does it become detached. The coating according to the invention even improves the seating of the window plugs in the ends of the tubing so that the risk of them being forced out with an increase in the internal pressure is reduced. This amazingly good and safe adhesion is a major advantage for sheathing materials of fluorocarbons such as particularly Teflon FEP having a refractive index of $n = 1.34$, and Hostaflon TFP having a refractive index of $n = 1.36$, as well as for PTFE Teflons ($n = 1.34$), Teflon PFA ($n = 1.34$) and Teflon ETFE ($n = 1.42$), and including PCTFE and PVDF. Should the connection of the Teflon AF coating according to the invention on the inside of the sheath of some materials fail to be less than perfect at some locations, the light losses at such locations can still be maintained slight for lightguiding fluids of $n > 1.4$ so that no appreciable losses in transmittance need be feared.

BRIEF DESCRIPTION OF THE DRAWINGS

The invention is illustrated by mean of an example embodiment in the sole drawing attached.

DESCRIPTION OF THE PREFERRED EMBODIMENT

The illuminator apparatus shown greatly simplified in the drawing contains a light source 10, a condenser 12 incorporating three quartz lenses coated with an anti-reflex film dimensioned for 365 nm, a light filter 14 and a light guide 16.

In the embodiment as shown the light source 10 comprises, for instance, a 200 W Hg high-pressure lamp 18, type HBO200 with a concave, spherical reflector 20.

The light source may comprise any other gas or vapor discharge lamp such as e.g. a xenon high pressure lamp or also a tungsten-halogen lamp. The light filter 20 is an ion-plated thin-film filter which reflects longwave radiation, i.e. longwave visible light and near infrared radiation.

The spectral bandpass of the light filter depends on the particular use of the illuminator apparatus. On polymerizer apparatus for industrial adhesives and for dental polymers radiation in the UVA range (approx. 330 thru 380 nm) or in the UVA range plus the blue spectral range (approx. 330 thru 480 nm) or UVB+UVA+blue (approx. 280–480 nm) is required. Such bandpass requirements can be satisfied by thin-film interference filters.

The liquid-core light guide comprises a flexible tubular sheath 21 of a flurocarbon polymer of the kind as explained above. This sheath can be selected in a thickness suitable for the particular application, e.g. ½ mm and serves as the substrate for a thin coating 22 according to the invention with which the inside of the sheath 21 is covered. The interior of the tubing configured as such is filled with a lightguiding fluid 23 and closed off at both ends by quartz or glass plugs 24 which are usefully firmly connected to the sheath 21 by a mechanical seal (not shown).

If the coating 22 is produced in Teflon AF 2400 which has a relatively low refractive index of $n=1.29$ use can be made of a lightguiding fluid 23 having a low refractive index, such as a fluorinated or phosphated solution, offering good resistance to shortwave light, e.g. UVB light (280 nm $<\lambda<$ 320 nm) due to the reserve as regards the difference in the refractive indexes. Chloridized solutions having a low chloride content may also be used in which merely suitably less chloride can be decomposed in the presence of shortwave radiation and transmittance is detrimented accordingly only to a minor degree.

The following cites some results obtained from tests carried out over several months. In particular tubular sheath material 21 of Teflon FEP and Hostaflon TFB coated with a thin film 22 of $<5$ μm particularly 3 μm both of Teflon AF 2400 and of Teflon AF 1600 were filled with a variety of lightguiding fluids 23. It was found out that particularly coatings of Teflon AF 1600 produced especially good results as regards improving transmittance, i.e. low light losses, increasing the numerical aperture to facilitate coupling the light into the light guide, reducing the transmittance losses during bending of the light guide and as regards the good adhesion of the coating 22 to the substrate sheath 21.

Although Teflon AF 2400 is not so easy to process it also enabled coatings 22 to be produced to permit production of light guides having a liquid-core of purest water.

Also in long-term testing of such light guides having a sheath 21 of fluorocarbon polymers and a coating 22 of Teflon AF it was found out that there was no indication whatsoever of the coating 22 becoming detached from the sheath 21 after more than a year. The consistency in the transmittance of the light guides, even when sharply bent is proof of the compatibility and durability of the coating even when wetted by the lightguiding fluids. Even following function tests with focussed radiation from 150 watt halogen lamps, 200 watt Hg high-pressure lamps and 250 watt HTI lamps lasting several 100 hours no deterioration in transmittance was observed, i.e. no deterioration of the coating 22 itself even under such energy loading conditions. Bending tests too, involving several thousand bendings resulted in no damage to the coating let alone a detachment of the coating from the substrate. The adhesion of the coating 22 to the substrate of the sheath 21 is so good that the coating itself even failed to become detached when the tight-fitting cylindrically shaped quartz plugs 24 forming the input and output windows for the light are forced into place.

Apart from the special case of the water-cored light guide, for which AF 2400 is required, coating a sheath of TFB material with Teflon AF 1600 is particularly effective, namely in conjunction with the usual lightguiding fluids (glycols, salt solutions), the refractive indexes of which do not permit any substantial increase above $n=1.45$.

Since this TFB material has a higher optical refractive-index (1.36) as compared to that of Teflon FEP the refractive index of the optically thinner medium can be forced down by 5/100 by employing a coating of Teflon AF 1600. When using a lightguiding fluid having $n=1.45$ this thus increases the total angle of aperture for the incident light beam from 60° to 80°, and the bending losses are reduced from 15% to less than 5% for a light guide having an active diameter of 5 mm for a curvature of $R=7$ cm.

Example 1

Water-Cored Light Guide

Lightguiding fluid 23: deionized highly pure water $n=1.33$, tubing: AF2400 applied as a coating 22 to the inside of a sheath 21 of FEP material; length 150 cm, dia.$_{int}=5$ mm, dia.$_{ext}=6$ mm 2 quartz plugs SiO$_2$ each 20 mm long thickness of coating 22 approx. 2 mm.

The transmittance of the light guide at $l=430$ nm and an incident light cone of 60° amounted to: $T=22\%$ (Aperture of the light guide being only 36°). For an incident light cone of only 10° the transmittance increases to 60%. In the case of an excimer laser (XeCl) as the light source 10 with $\lambda=308$ nm the transmittance amounted to 60%. For these measurements the light guide was U-shaped with a bending radius of $R=30$ cm. Due to the minor difference in the refractive index between the light-guiding fluid 23 and the coating 23 ($\Delta n=3/100-4/100$) this water-cored light guide is particularly suitable for radiation sources having a very low divergence of the incident light, i.e. for laser radiation, preferably UV laser radiation of an excimer laser with emission at $\lambda=308$ nm (XeCl) since H$_2$O offers excellent UV transmittance. As a laser light guide the active diameter of the water core should be less than 5 mm, e.g. 2 mm or 1 mm to minimize the bending losses.

The substrate sheath 1 has preferably an internal diameter dia.$_{int}$ of 2 mm and an external diameter dia.$_{ext}$ of 4 mm and may consist of FEP, PTFE, PFA, ETFE or TFB material. As a closed-loop system this water-cored light guide having FEP substrate material as aforementioned has exactly maintained its transmittance over a period of 5 months to date (Since there is a risk of H$_2$O vapor diffusing from the interior of the tubing to the surroundings due to the permeability of the tubing wall in this respect, a thicker wall of e.g. 1 mm is favorable for this water-cored light guide).

Example 2

Light guide having a liquid core 23 of triethylene glycol with the addition of 8% H$_2$O ($n=1.45$), a sheath 21 of fluorocarbon terpolymer TFB, length=230 cm, dia.$_{int}$ of 5 mm, dia.$_{ext}$ of 6 mm and a coating 22 of AF 1600 ($n=1.31$), with a thickness $\geq 2$ μm and closed off at both ends by quartz glass plugs.

Transmittance measurement was made with blue light $l=430$ nm for an incident light cone of 60° and produced a mean transmittance of 79.3% for 10 light guides measured with a coating 22 of AF 1600. The bending losses were measured for a light guide wrapped twice around a circular cylinder of $r=7$ cm and resulted in a reduction in transmittance of around a mere 3% down to 76%. Making the measurements on 10 control light guides under the same conditions, but without the AF 1600 coating 22 produced a mean transmittance of 72.5% and in bend testing 64%. The mean transmittance of the light guide coated with AF 1600 is 9.4% higher in the weakly bent or straight condition, this increasing to a remarkable 20% in the strongly bent condition.

Example 3

Sheath material: Copolymer of tetrafluorethylene and hexafluorpropylene (FEP),
Inner Coating: Teflon AF 1600,
Liquid: Aqueous calcium chloride solution.

Example 4

Sheath material: Copolymer of tetrafluorethylene and hexafluorpropylene (FEP),
Inner Coating: Teflon AF 1600,
Liquid: triethyleneglycol containing 10% by weight $H_2O$ (the water content-may vary between 8 and 15%)

Example 5

Sheath material: Terpolymer of tetrafluorethylene, hexafluorpropylene and vinylidenfluoride.,
Inner coating and liquid as in example 4.

Example 6

Sheath material and coating as in Example 4
Liquid: Tetraethylene glycol, water content as in Example 4.

Example 7

Sheath material as in Example 1,
Coating: as in Example 1, thickness 5 μm (at least 3 μm)
Liquid: Polychlorotrifluoroethylene oil having the general formula

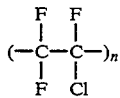

and a refractive index of about 1,40 to 1,41.

Example 8

Sheath material and coating as in Example 5,
Liquid: Phenylmethylsilicone oil.

What is claimed is:

1. An illuminator apparatus having a light source and, optically coupled thereto, a liquid-core light guide comprising a cylindrical, tubular sheath of fluorocarbon material having an inner wall and surrounding an active core of a lightguiding liquid, wherein said inner wall of said sheath is coated with a thin layer of an amorphous copolymer, based on a combination of tetrafluorethylene and a fluorinated cyclic ether (Teflon AF ®) and said coating has a thickness of less than 10 μm.

2. An illuminator apparatus as set forth in claim 1, wherein said sheath consists of TFB material (terpolymer of tetrafluoroethylene, hexafluoropropylene and vinylidenfluoride).

3. An illuminator apparatus as set forth in claim 1, wherein said sheath consists of FEP material (copolymer of tetrafluoroethylene and hexafluoropropylene).

4. An illuminator apparatus as set forth in claim 1, wherein said sheath consists of PFA material (perfluoroalcoxy polymer).

5. An illuminator apparatus as set forth in claim 1, wherein said sheath consists of PTFE material (polytetrafluoroethylene).

6. An illuminator apparatus as set forth in claim 1, wherein said sheath consists of ETFE material (copolymer of ethylene and tetrafluoroethylene).

7. An illuminator apparatus as set forth in claim 1, wherein said sheath consists of a material selected from the group of materials consisting of PVDF polyvinylidenfluoride) and PCTFE (polychlorotrifluoroethylene).

8. An illuminator apparatus as set forth in claim 1, wherein the material of said coating (2) has a glass transition temperature in the range 160° thru 240° C.

9. An illuminator apparatus as set forth in claim 1, wherein the glass transition temperature of said coating is less than 240° C.

10. An illuminator apparatus as set forth in claim 1, wherein said lightguiding fluid comprises at least one fluid selected from the group of fluids consisting of monoethyleneglycol, dietyleneglycol, triethyleneglycol and tetraethyleneglycol.

11. An illuminator apparatus as set forth in claim 1, wherein said lightguiding fluid comprises an aqueous solution of at least one salt selected from the group of salts consisting of chlorides and fluorides of alkali and earth alkali metals.

12. An illuminator apparatus as set forth in claim 1, wherein said lightguiding fluid consists of a phosphated aqueous solution.

13. An illuminator apparatus having a light source and, optically coupled thereto, a liquid-core light guide comprising a cylindrical, tubular sheath of fluorocarbon material having an inner wall and surrounding an active core of a lightguiding liquid, wherein said inner wall of said sheath is coated with a thin layer of an amorphous copolymer, based on a combination of tetrafluorethylene and a fluorinated cyclic ether (Teflon AF ®), wherein said lightguiding fluid comprises at least one fluid selected from the group of fluids consisting of monoethyleneglycol, dietyleneglycol, triethyleneglycol and tetraethyleneglycol; and said lightguiding fluid contains a percentage of water exceeding 5%.

14. An illuminator apparatus as set forth in claim 13, wherein said lightguiding fluid contains a percentage of water between 7 and 15%.

15. An illuminator apparatus as set claim 1, wherein the material of said coating has a glass transition temperature of 240° C. (Teflon AF 2400) and said lightguiding fluid is selected from the group of fluids consisting of pure water, water with the addition of a fluoride, water with the addition of a phosphate, water with the addition of a chloride.

16. An illuminator apparatus as set forth in claim 15, wherein said addition of a fluoride is selected from the group of additives consisting of potassium, caesium and ammonium fluoride and calcium chloride and having a concentration which produces a refractive index of up to n=1.44.

17. An illuminator apparatus having a light source and, optically coupled thereto, a liquid-core light guide comprising a cylindrical, tubular sheath of fluorocarbon material having an inner wall and surrounding an active core of a lightguiding liquid, wherein said inner wall of said sheath is coated with a thin layer of an amorphous copolymer, based on a combination of tetrafluorethylene and fluorinated cyclic ether (Teflon AF®), wherein
  said lightguiding fluid is water with the addition of a phosphate, and
  said phosphate is selected from the group of phosphates consisting of $K_2HPO_4$, $Na_2HPO_4$, $NaH_2PO_4$ and having a concentration which produces a refractive index of up to n=1.42.

18. An illuminator apparatus as set forth in claim 1, wherein said light source contains a high-pressure gas or vapor discharge lamp.

19. An illuminator apparatus as set forth in claim 1, wherein said light source contains a tungsten-halogen lamp.

20. An illuminator apparatus as set forth in claim 1, wherein a light filter is inserted between said light source and said liquid-core light guide.

21. An illuminator apparatus as set forth in claim 20, wherein said light filter has a passband of approx. 330 thru 380 nm.

22. An illuminator apparatus as set forth in claim 20, wherein said light filter has a passband of approx. 330 thru 480 nm.

23. An illuminator apparatus as set forth in claim 20, wherein said light filter has a passband of approx. 280 thru 480 nm.

24. An illuminator apparatus including a light source and a liquid core light guide optically coupled to said light source, said light guide having an inner wall and comprising:
  a tubular sheath made of a copolymer of tetrafluorethylene and hexafluorpropylene (FEP),
  a coating made of teflon AF® on said inner wall, and
  a liquid core comprising an aqueous calcium chloride solution.

25. An illuminator apparatus including a light source and a liquid core light guide optically coupled to said light source, said light guide having an inner wall and comprising:
  a tubular sheath made of a material selected from the group of materials consisting of a copolymer of tetrafluorethylene and hexafluorpropylene (FEP), and a terpolymer of tetrafluorethylene, hexafluorpropylene and vinylidenechloride
  a coating made of teflon AF® on said inner wall, and
  a liquid core comprising at least one of the compounds of the group of compounds consisting of tri- and tetraethyleneglycol.

26. An illuminator apparatus including a light source and a liquid core light guide optically coupled to said light source, said light guide having an inner wall and comprising:
  a tubular sheath made of a copolymer of tetrafluorethylene and hexafluorpropylene (FEP),
  a coating made of Teflon AF® on said inner wall, and
  a liquid core comprising a polychlorotrifluoroethylene oil.

27. An illuminator apparatus as claimed in claim 25, wherein said layer has a thickness of at least 3 μm.

28. An illuminator apparatus as claimed in claim 25, wherein said layer has a thickness of 5 μm.

29. An illuminator apparatus including a light source and a liquid core light guide optically coupled to said light source, said light guide having an inner wall and comprising:
  a tubular sheath made of a terpolymer of tetrafluorethylene, hexafluorpropylene and vinylidenechloride.
  a coating made of teflon AF® on said inner wall, and
  a liquid core comprising a phenylmethylsilicone oil.

30. An illuminator apparatus as set forth in claim 24, wherein the thickness of said coating is less than 10 μm.

31. An illuminator apparatus as set forth in claim 25, wherein said lightguiding fluid contains a percentage of water between 7 and 15%.

32. An illuminator apparatus as set forth in claim 13, wherein said sheath consists of FEP material (copolymer of tetrafluoroethylene and hexafluorpropylene).

33. An illuminator apparatus as set forth in claim 13, wherein said sheath consists of TFB material (terpolymer of tetrafluoroethylene, hexafluorpropylene and vinylidene fluoride).

34. An illuminator apparatus as set forth in claim 17, wherein said sheath consists of FEP material (copolymer of tetrafluoroethylene and hexafluoropropylene).

35. An illuminator apparatus including a light source and a liquid core light guide optically coupled to said light source, said light guide having an inner wall and comprising:
  a tubular sheath made of TFB material (terpolymer of tetrafluorethylene, hexafluorpropylene and vinylidene fluoride),
  a coating made of Teflon AF® on said inner wall, and
  a liquid core comprising a polychlorotrifluoroethylene oil.

* * * * *